(12) United States Patent
Lynn et al.

(10) Patent No.: US 9,391,556 B2
(45) Date of Patent: Jul. 12, 2016

(54) METHOD AND APPARATUS FOR OPERATING AN ELECTRICAL DRIVE SYSTEM

(71) Applicant: MBDA UK Limited, Stevenage, Hertfordshire (GB)

(72) Inventors: David Mark Lynn, Stevenage (GB); Leonard James Kirkland, Stevenage (GB)

(73) Assignee: MBDA UK LIMITED, Hertfordshire (GB)

( * ) Notice: Subject to any disclaimer, the term of this patent is extended or adjusted under 35 U.S.C. 154(b) by 52 days.

(21) Appl. No.: 13/813,548

(22) PCT Filed: Jan. 8, 2013

(86) PCT No.: PCT/GB2013/050019
§ 371 (c)(1),
(2) Date: Feb. 22, 2013

(87) PCT Pub. No.: WO2013/104896
PCT Pub. Date: Jul. 18, 2013

(65) Prior Publication Data
US 2013/0193896 A1 Aug. 1, 2013

(30) Foreign Application Priority Data

Jan. 12, 2012 (GB) .................................. 1200537.7
May 6, 2012 (EP) .................................. 12168324

(51) Int. Cl.
*G01R 31/02* (2006.01)
*H02P 21/00* (2016.01)
(Continued)

(52) U.S. Cl.
CPC ................ *H02P 31/00* (2013.01); *H02P 21/04* (2013.01); *B60L 15/025* (2013.01)

(58) Field of Classification Search
CPC ..... H02P 31/00; H02P 21/06; H02P 21/0035; H02P 21/0089; H02P 21/00; H02P 21/005; H02P 6/18; H02P 21/0092; H02P 21/04; B60L 15/025
USPC ......................................................... 318/490
See application file for complete search history.

(56) References Cited

U.S. PATENT DOCUMENTS 4,845,418 A * 7/1989 Conner .......................... 318/778
5,583,406 A * 12/1996 Mutoh et al. ................. 318/376
(Continued)

FOREIGN PATENT DOCUMENTS

| DE | 10 2010 040766 A1 | 3/2012 |
| EP | 0 257 628 A2 | 3/1988 |
| EP | 1 289 120 A1 | 3/2003 |

OTHER PUBLICATIONS

Jung-Ik Ha et al: Position-Controlled Synchronous Reluctance Motor Without Rotational Transducer, IEEE Transactions on Industry Applications, IEEE Service Center, Piscataway, NJ, US, vol. 35, No. 6, Dec. 1, 1999, XP011022666, ISSN: 0093-9994 pp. 1394-139; figures 5,10.*

(Continued)

*Primary Examiner* — Bentsu Ro
*Assistant Examiner* — Zemenay Truneh
(74) *Attorney, Agent, or Firm* — Scully, Scott, Murphy & Presser, P.C.

(57) ABSTRACT

An electrical drive system includes an electric motor having an armature, which is mounted on a stator, and a rotor, wherein aligning stator flux with rotor flux enables current to flow in the armature without inducing torque on the rotor shaft. The disclosed operation may be used, for example, in testing the electrical drive system. The electric drive system can carry full rated current yet produce little or no torque, thereby increasing the current that can be tested during electrical drive test procedures without producing undesired forces or motion. The method may be used, for example, in heating the electric motor, for example for de-icing.

23 Claims, 2 Drawing Sheets

(51) Int. Cl.
  *H02P 31/00* (2006.01)
  *H02P 21/04* (2006.01)
  *B60L 15/02* (2006.01)

(56) References Cited

U.S. PATENT DOCUMENTS

| | | | |
|---|---|---|---|
| 6,335,609 B1* | 1/2002 | Amey et al. | 318/811 |
| 2007/0210741 A1* | 9/2007 | Nagata et al. | 318/807 |
| 2008/0042606 A1* | 2/2008 | Chen | 318/474 |
| 2009/0120714 A1* | 5/2009 | Hisanaga et al. | 180/446 |
| 2009/0179604 A1* | 7/2009 | Johnson | 318/400.34 |
| 2009/0284204 A1 | 11/2009 | Colby et al. | |
| 2009/0315492 A1* | 12/2009 | Oomura | 318/400.02 |
| 2011/0266982 A1* | 11/2011 | Rollman | 318/376 |
| 2012/0217908 A1* | 8/2012 | Wu | H02P 21/04 318/400.02 |

OTHER PUBLICATIONS

Don Platt, Reluctance Motor with Strong Rotor Anisotropy, May/Jun. 1992, IEEE, pp. 652-658.*
Search Report issued on Apr. 18, 2012, by the British Patent Office for Application No. 1200537.7.
Search Report issued on Oct. 17, 2012, by the European Patent Office for Application No. 12168324.7.
Notification of Transmittal of the International Search Report (Forms PCT/ISA/220 and PCT/ISA/210) and the Written Opinion of the International Searching Authority (Form PCT/ISA/237) dated Jan. 8, 2013, issued in corresponding International Application No. PCT/GB2013/050019. (13 pages).
Jung-Ik Ha et al., Sensorless Rotor Position Estimation of an Interior Permanent-Magnet Motor From Initial States, IEEE Transactions on Industry Applications, vol. 39, No. 3, May/Jun., 2003, pp. 761-767.
Jung-Ik Ha et al., "Postion-Controlled Synchronous Reluctance Motor Without Rotational Transducer", IEEE Transactions on Industry Applications, vol. 35, No. 6, Nov./Dec. 1999, pp. 1393-1398.

* cited by examiner

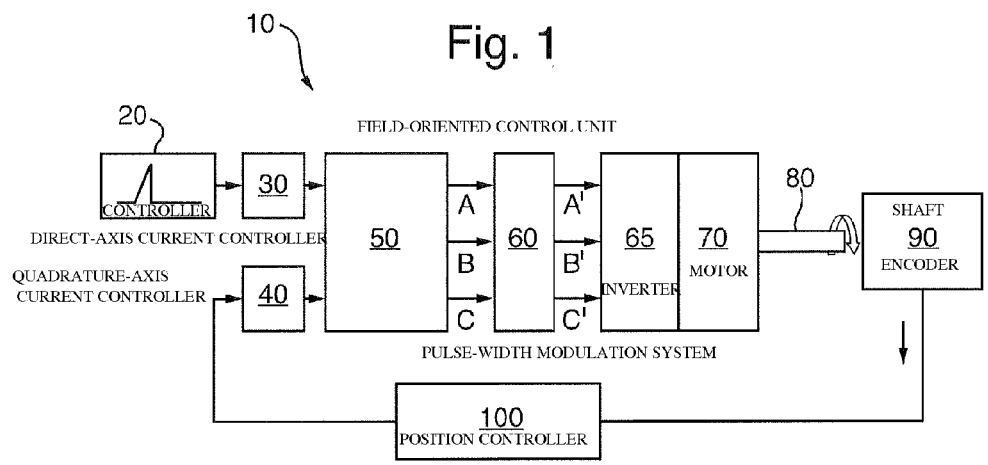
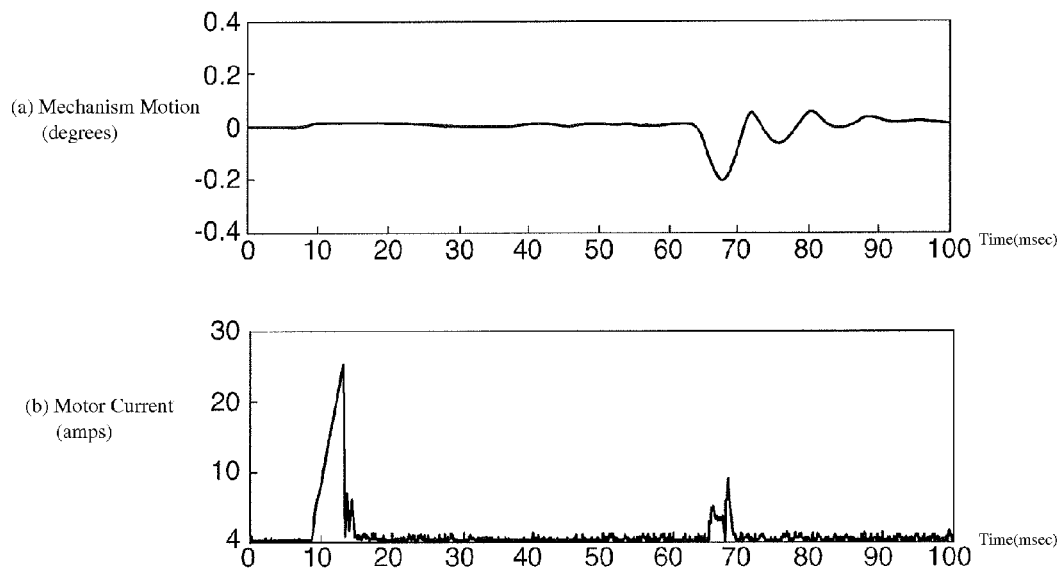

METHOD AND APPARATUS FOR OPERATING AN ELECTRICAL DRIVE SYSTEM

FIELD OF THE INVENTION

This Invention relates to electrical drive systems, and in particular to methods and apparatuses for operating electrical drive systems that include an electric motor. Example embodiments of the invention relate to methods and apparatuses for testing an electrical drive system. Other example embodiments of the invention relate to methods and apparatuses for heating an electric motor comprised in the electrical drive system.

BACKGROUND ART

Periodic testing of an electrical motor is often required throughout the life of the motor, to ensure that its full rated current can be drawn and that of all its drive circuits are intact and operating correctly. Some servo actuators use electrical motors in the form of electrical drives to convert electrical energy to mechanical motion (translational or rotational); for example, an electrical drive may be connected to a ball-screw, lever arm or gimbal mechanism. In some applications, it is difficult to test electrical parts of the drive train, because of mechanical constraints. That is the case, for example, where actuation by a servo electric motor during testing is undesirable, for example because the mechanical motion that would be produced by the motor during electrical testing actuates a one-time mechanism of some kind, e.g. triggering of an irreversible latching or unlatching mechanism. Only limited tests can be carried out on such a system, if full-rated current cannot be used because of such constraints.

For example, the fins of some missiles are driven by an electromechanical system using a brushless DC-motor powered by a thermal battery. The missile fins are mechanically locked close to their zero position up to a point shortly after launch. During the missile launch sequence, prior to fin unlock, the missile is required to test activation of the actuator thermal battery. Prior-art systems have done that by driving the fins against a fin-locking mechanism, causing a large current to be drawn and thus proving that the battery is functioning correctly. Similarly, powered tests of the motor drive system may also be required during built-in test sequences, which may for example be with an external power supply. In prior-art missile designs, the locking mechanism is a pyrotechnic locking mechanism, which can withstand the driven fins during the testing. However, it would be preferable to provide a locking mechanism in the form of a simple shear-pin design, which would be less expensive and more reliable; however, were a shear-pin to be used, correct functioning of the thermal battery activation and the motor drive system could not be proved by driving the motors against the mechanism, as that would shear the locking pin. Rather, the currents used would be much less than the full rated current, to reduce the torque provided to a level low enough to avoid shearing the pin.

There therefore exists a need for a method and apparatus for operating an electrical drive system that enables testing of its drive circuits at full rated current without actuating any mechanism arranged to be actuated by the electric motor during normal (i.e. non-test) use.

In addition to testing applications, there are other situations in which it would be advantageous to be able to operate an electrical drive system without producing torque on the motor.

DISCLOSURE OF THE INVENTION

A first aspect of the invention provides a method of operating an electrical drive system that includes an electric motor having an armature and which can be represented as having two armature phases, the electric motor comprising a stator and a rotor, the method comprising the steps of:
i) driving the motor in accordance with a non-zero current demand profile to produce a direct axis current and/or a quadrature axis current in the armature;
ii) aligning flux produced by the stator with flux produced by the rotor;
iii) monitoring the position of the rotor; and
iv) controlling the direct axis current and/or the quadrature axis current to avoid or minimise rotation of the rotor.

The fluxes may be aligned by controlling a current. The motor may include an armature and it may be that the fluxes are aligned by controlling a current flowing in the armature. The armature may consist of or include armature windings and the controlled current may be a current flowing in the armature windings. The armature may be mounted on the stator. The armature may be mounted on the rotor.

The motor may comprise a field winding and/or permanent magnet(s), which may be configured to produce the main field flux in the motor. It may be that the field winding, or alternatively the permanent magnet(s), is mounted on the stator, if the armature is on the rotor. It may be that the field winding, or alternatively the permanent magnet(s), is mounted on the rotor, if the armature is on the stator.

Aligning the stator flux with the rotor flux enables current to flow in the armature without inducing torque on the rotor. It may be that the fluxes are aligned to within 10 degrees, preferably within 5 degrees, still more preferably within 2 degrees or within 1 degree. Advantageously, a feedback loop is used to minimise misalignment of the fluxes.

The method may be, for example, a method of testing the electrical drive system. The invention may enable the electric drive system to carry full rated current yet produce little or no torque, thereby increasing the current that can be tested during electrical drive test procedures, compared with prior-art procedures.

The method may be, for example, a method of heating an electric motor, for example for the purposes of de-icing. Again, the invention may enable the electric drive system to carry full rated current yet produce little or no torque, thereby allowing the current to be used to generate heat in the motor.

It is known to set or vary the torque of a motor by controlling the current feed of the motor, in a technique known as field-oriented control (FOC) or vector control. However, the invention can be understood to involve utilising FOC or similar techniques in order to eliminate torque, whilst allowing testing, heating or another operation using the electrical drive.

It may be that the stator and rotor fluxes are aligned by controlling a voltage across the armature. It may be that the magnitude and orientation of flux produced by current in the armature is determined by controlling a voltage across the armature. The method may include monitoring the voltage and/or a current corresponding to the voltage. The voltage may have 3 or more phases, for example it may be a 3-phase, 6-phase or 12-phase supply. The method may include the step of monitoring at least 2 of the phases of the voltage and/or of the current. The method may include the step of calculating a direct-axis armature current from the at least 2 monitored phases. It may be that the direct-axis armature current is controlled to be non-zero. The method may include the step of calculating quadrature-axis armature current from the at least 2 monitored phases. It may be that the quadrature-axis current is controlled to be zero.

The method may include representing the motor as an equivalent motor having two armature phases. The two phases may be defined with reference to the alignment of the rotor. The two phases may be a direct-axis phase and a quadrature-axis phase.

The method may include the step of controlling the direct-axis current according to a current demand profile, for example a ramped setpoint.

The method may include sensing any rotation of the rotor and compensating for that rotation by adjusting the direct-axis current and/or the quadrature-axis current to produce a counteracting torque. The rotation may be sensed using a shaft encoder. The rotation may be sensed by monitoring the angular position of the rotor, or by monitoring the first derivative of that position with respect to time, or by monitoring the second derivative of that position with respect to time, or by monitoring any combination of those parameters.

The method may include the step of calculating a 3-phase voltage demand that generates the demanded direct-axis current and quadrature-axis current, using, for example, a field-oriented control unit. The method may include the step of supplying the calculated 3-phase voltage to a pulse-width modulation system configured to construct and apply the calculated phase voltages. The voltages may be applied to the motor using an inverter.

The method may further include the step of providing a non-zero quadrature-axis current to the motor. The non-zero quadrature-axis current may be supplied with the intention of producing torque on the rotor. It may be advantageous to supply such a current in order to check that non-movement of the rotor results from the control of the currents and not from simple failure of the motor.

The method may include testing an inverter associated with the electric motor, using any of the above-described steps.

The method may comprise the steps:
(i) monitoring of the rotor position and current in the armature in at least two (of e.g. 3) phases.
(ii) transforming the monitored current into direct-axis current and quadrature-axis current components, relative to a frame of reference aligned with the monitored rotor position.
(iii) comparing the direct-axis current and quadrature-axis current components against target values for those components.
(iv) calculating the direct-axis and quadrature-axis voltages needed to produce the target current component values.
(v) transforming the calculated direct-axis and quadrature-axis voltages back into the original frame of reference.
(vi) applying the transformed calculated voltages to the motor.
(vii) optionally, pausing.
(viii) repeating from (i).

A second aspect of the invention provides an electrical drive system that includes an electric motor, the electric motor comprising a stator and a rotor, the electrical drive system including a control system configured to align flux produced by the stator with flux produced by the rotor.

It may be that the control system is also configured to align, in an alternative mode of operation, the stator and rotor fluxes such that torque is produced on the rotor. It may be that, in the alternative mode of operation, the stator and rotor fluxes are aligned perpendicularly or substantially perpendicularly.

It may be that the electric motor is comprised in a servo actuator. It may be that the electric motor is configured to produce mechanical motion to actuate a mechanism. It may be that the mechanism is a latching or unlatching mechanism. It may be that the mechanism is configured to be altered irreversibly by the actuation; for example, the mechanism may be a shear pin that is sheared by the actuation.

It may be that the electric motor is configured to actuate release of the fins of a missile. It may be that the electric motor is configured to unlatch a latching mechanism arranged to restrain the fins of the missile during launch of the missile. The latching mechanism may for example be a shear pin and the electric motor may be configured to break the shear pin on actuation after launch of the missile.

It may be that the rotor comprises a permanent magnet, which may be interior or surface mounted. It may be that the rotor includes no windings. It may be that the rotor consists of one or more permanent magnets. It may be that the stator comprises a permanent magnet. It may be that the stator comprises no windings.

The rotor may be a 2-pole rotor. The rotor may have 4 or more poles.

The rotor may be, for example, a direct-current motor. The motor may be a brushless motor. The motor may be a brushless dc motor. The motor may be a synchronous motor.

It may be that the motor has 3 or more phases.

It will of course be appreciated that features described in relation to one aspect of the present invention may be incorporated into other aspects of the present invention. For example, the method of the invention may incorporate any of the features described with reference to the system of the invention and vice versa.

BRIEF DESCRIPTION OF THE DRAWINGS

Example embodiments of the invention will now be described by way of example only, with reference to the accompanying drawings, of which:

FIG. 1 is a schematic system diagram of an apparatus, according to an example embodiment of the invention, for testing an electric motor FIG. 3 is a plot of (a) fin orientation in degrees, and (b) motor current in Amps versus time in milliseconds, during a test sequence using the apparatus of FIG. 1.

For convenience and economy, the same reference numerals are used in different figures to label identical or similar elements of the engines shown.

DETAILED DESCRIPTION

Figure 2:
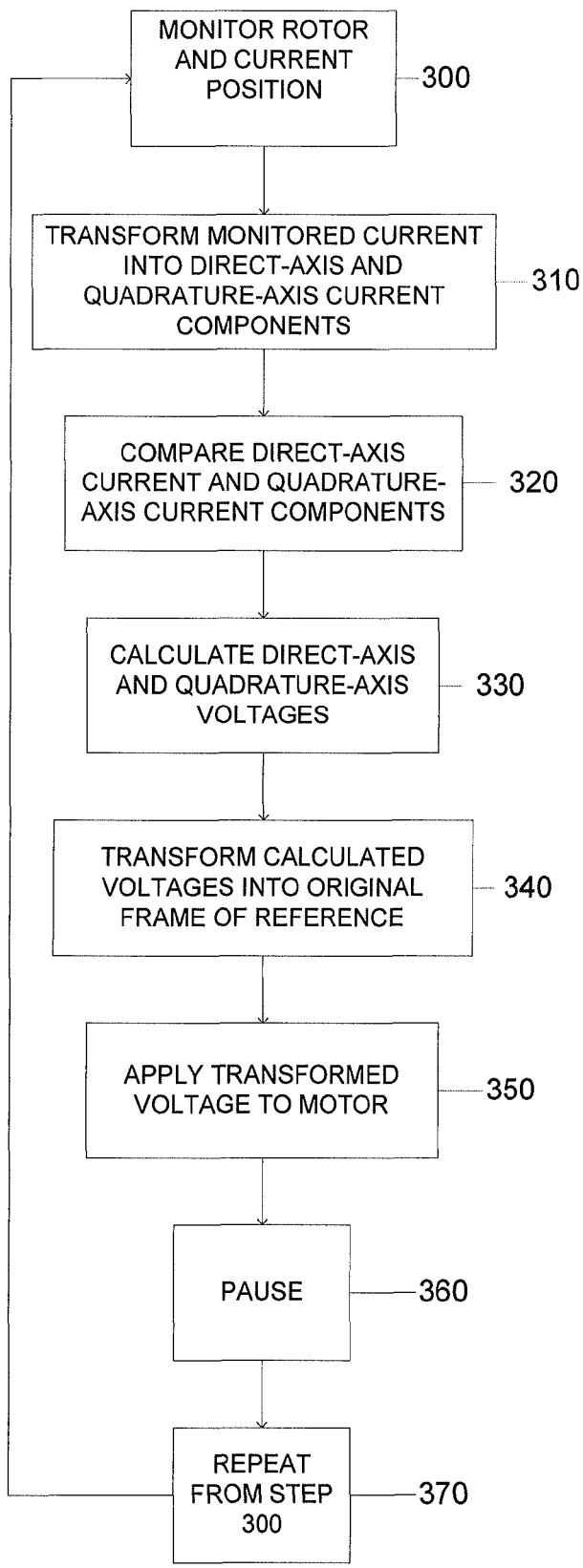
FIG. 2 is a flow chart showing an example method of operating the apparatus of FIG. 1, in accordance with and example embodiment of the invention.

In an example embodiment of the invention, a motor drive algorithm uses FOC to draw full current through a brushless direct-current motor without generating torque. The FOC motor drive algorithm represents a 3-phase motor as an equivalent 2-phase device, with armature currents referred to the rotor. That allows independent control of, on the one hand, the currents in direct alignment with the field flux (i.e. in the direct axis) and, on the other hand, the currents in quadrature with the field flux (i.e. on the quadrature axis). By deliberately aligning the armature flux with the field flux, rather than by offsetting by 90° as is usual in motor drives, high current can flow in the motor whilst inducing little, if any, rotor torque.

Additionally, in this example, a position and velocity control loop with a zero setpoint is used to control the quadrature-axis current. Any motor rotation that is sensed is compensated for using the quadrature-axis currents, further reducing any residual torque induced by the high direct-axis currents, and thus further reducing the rotor motion.

This example embodiment will now be described in more detail.

Referring to FIG. 1, an electrical drive system 10 according to an embodiment of the invention incorporates a control system comprising a direct-axis current controller 30 and a quadrature-axis current controller 40. A current demand profile is issued by a controller 20 configured to provide a setpoint function. In this example, the current demand profile is a ramped setpoint, i.e. an instantaneous current demand setpoint increasing linearly from zero to a full-rated current before returning rapidly to zero. The current demand profile is the current demand that is used to test the inverter 65 and motor 70. The current demand profile is applied to the direct-axis current controller 30.

Although both the direct-axis and quadrature-axis currents are controlled by feedback loops (from the inverter 65 to the direct-axis current controller 30 and the quadrature-axis current controller 40, respectively), position feedback is used for calculating the quadrature-axis current demand only. The rotational position of the shaft 80 of the motor 70 is monitored using a shaft encoder 90. The position information passes from the shaft encoder 90 to a position controller 100, which calculates a quadrature-axis current demand value, aiming to keep the motor shaft 80 stationary. The position controller 100 calculates and applies the quadrature-axis current demand value to the quadrature-axis current controller 40.

The inverter 65 and motor 70 are of a 3-phase construction. Motor phases are converted to a 2-phase direct- and quadrature-axis representation using the standard Clarke and Park transformations (see e.g. Modern Power Electronics and AC Drives, p56-59, Bimal K Bose, Prentice Hall 2002. ISBN 0-13-016743-6). Individual feedback control of the direct-axis and quadrature-axis currents is then implemented. The current controllers 30, 40 issue demand voltage setpoints to a field-orientated control unit 50, which maps the demand voltage setpoints back to a 3-phase representation using the appropriate inverse transformations. The 3-phase voltage demands are supplied to a pulse-width modulation system 60, which then constructs and applies the demanded phase voltages using inverter 65.

FIG. 2 shows an overview of this example method of operating the electrical drive system. The drawing shows the following steps:

Step 300: Monitor the rotor position and the current in a least two (of e.g. 3) phases.
Step 310: Transform the monitored current into direct-axis current and quadrature-axis current components, relative to a frame of reference aligned with the monitored rotor 80 position.
Step 320: Compare the direct-axis current and quadrature-axis current components against target values for those components.
Step 330: Calculate the direct-axis and quadrature-axis voltages across the motor 70 needed to produce the target current component values.
Step 340: Transform the calculated direct-axis and quadrature-axis voltages back into the original frame of reference.
Step 350: Apply the transformed calculated voltage to the motor 70.
Step 360: Pause.
Step 370: Repeat from step 300.

A test system was constructed according to the system design of FIG. 1. The test system applied the ramped direct-axis current demand 20 and then, after a time delay, applied a similar quadrature-axis current demand. (The quadrature-axis current demand was applied in order to check that neither the inverter 65 nor the motor 70 was simply dead.). The motor 70 was connected to a drive mechanism providing 100:1 gearing and a torsional spring load.

FIG. 3 shows the resulting motor current (lower plot) and mechanism motion (upper plot). The ramped direct-axis current demand can be seen to have an effect around the 8-14 ms time period. The motor current rises from zero to 25 Amps, yet the mechanism moves by only around 0.02°. The electrical drive circuitry is therefore proved to be functional, and its ability to supply full rated current is proven.

At 65 ms the smaller quadrature-axis current demand was imposed, and reset to zero 2 ms later. The direct-axis demand remained zero. During this time period the motor current rose to around 4 Amps, and 0.2° of motion was observed. When the quadrature-axis current demand returned to zero, a current spike was observed as the energy stored in the torsional spring was returned to the power supply through generator action. The mechanism position then exhibited decaying oscillations.

The deliberate use of motor armature current to produce flux along the direct-axis is thus shown to allow large currents to be passed through the motor without creating significant electromagnetic torque.

In another example embodiment of the invention, the apparatus is used to test a motor 70 connected to a mechanism locked by a shear-pin. Confidence can be gained that the power supply and motor drive is operational, and can draw full rated current, without breaking the shear-pin. The ability to carry out the test allows the shear-pin lock to be used in applications where reliable operation is essential, and where previously a pyrotechnic lock may have been preferred. A shear-pin mechanism is significantly cheaper than a pyrotechnic lock.

Example embodiments of the invention thus enable the carrying out of for example through-life drive circuit tests and battery tests, enabling verification or proving of proper operation of electrical power sources and circuitry, without generating undesirable torque or force within mechanisms. In example embodiments of the invention in which an element that is designed to be broken by the motor in use, for example a shear-pin used to restrain a mechanism, is used to provide a lock or zero-position, this invention improves the coverage of test sequences, as inverter and motor circuitry may be tested at full rated current without breaking the shear-pin. This capability can remove the need to partly disassemble a mechanism prior to test, reducing through-life service and test costs, or allow more comprehensive in-situ testing of electrical drive systems.

Whilst the present invention has been described and illustrated with reference to particular embodiments, it will be appreciated by those of ordinary skill in the art that the invention lends itself to many different variations not specifically illustrated herein.

For example, whilst the example embodiment has been described in the context of testing an electrical drive system, there are other example embodiments in which the ability to operate the drive system at a high current without producing any torque in the motor is used for other purposes. For example, in some embodiments, the high current is used to heat the motor, for example to de-ice the motor and/or surroundings equipment.

Where in the foregoing description, integers or elements are mentioned which have known, obvious or foreseeable equivalents, then such equivalents are herein incorporated as if individually set forth. Reference should be made to the claims for determining the true scope of the present invention, which should be constructed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A method of testing an electrical drive system comprising an electric motor connected to a latching or unlatching mechanism for actuation thereof, the drive system having a stator, a rotor and an armature, and which can be represented as having two armature phases, the method comprising:
   i) driving the motor in accordance with a non-zero current demand profile, which profile requires driving the motor at full-rated or near full-rated current to produce a direct axis current in the armature and/or a quadrature axis current in the armature;
   ii) aligning flux produced by the stator with flux produced by the rotor;
   iii) monitoring the position of the rotor; and
   iv) controlling the direct axis current in the armature and/or the quadrature axis current in the armature to avoid or minimise rotation of the rotor, thereby producing little or no torque at full-rated or near full-rated current without breaking the latching or unlatching mechanism.

2. A method as claimed in claim 1, comprising:
   aligning stator and rotor fluxes by controlling a current flowing in the armature.

3. A method as claimed in claim 1, comprising:
   aligning stator and rotor fluxes by controlling a voltage across the armature.

4. A method as claimed in claim 3, in which the motor has 3 or more phases and the method comprises:
   monitoring at least 2 related phases of a current in the armature.

5. A method as claimed in claim 4, comprising:
   calculating a direct-axis armature current and/or a quadrature-axis armature current from the at least 2 monitored phases and the rotor position.

6. A method as claimed in claim 1, comprising:
   controlling the direct-axis current according to a non-zero current demand profile.

7. A method as claimed in claim 6, wherein the non-zero current demand profile comprises:
   full-rated or near full-rated current demand.

8. A method as claimed in claim 1, comprising:
   controlling the quadrature-axis current to be non-zero.

9. A method as claimed in claim 1, wherein said monitoring comprises:
   sensing any rotation of the rotor, and said controlling comprises:
   compensating for rotor rotation by adjusting the direct-axis current and/or the quadrature-axis current.

10. A method according to claim 9, wherein said controlling, comprises:
    compensating for rotor rotation by adjusting the quadrature-axis current.

11. A method as claimed in claim 1, comprising:
    calculating a 3-phase voltage demand that generates a demanded direct-axis current and/or quadrature-axis current.

12. A method as claimed in claim 1, comprising:
    i. monitoring the rotor position and current in the armature in at least two phases;
    ii. transforming the monitored current into direct-axis and quadrature-axis current components, relative to a frame of reference aligned with the monitored rotor position;
    iii. comparing the direct-axis current and quadrature-axis current components against target values for those components;
    iv. calculating direct-axis and quadrature-axis voltages across the armature needed to produce the current component target values;
    v. transforming the calculated direct-axis and quadrature-axis voltages back into an original frame of reference;
    vi. applying the transformed calculated voltages to the armature;
    vii. optionally, pausing; and
    viii. repeating from the monitoring of (i).

13. A method as claimed in claim 1, wherein, the motor comprises:
    a dc brushless motor.

14. A method according to claim 1, wherein the electric motor is connected to a latching mechanism arranged to restrain the fins of a missile during launch of the missile.

15. A method according to claim 14, wherein the latching mechanism comprises a shear pin configured to break on actuation.

16. An electrical, drive system comprising:
    an electric motor having a stator, a rotor and an armature and being configured to produce mechanical motion to actuate a latching or unlatching mechanism:
    a control system configured to align flux produced by the stator with flux produced by the rotor;
    a rotor monitor for monitoring a position of the rotor;
    a quadrature-axis current controller;
    a direct-axis current controller configured to drive the motor in accordance with a non-zero current demand profile, which profile requires driving the motor at full-rated or near full-rated current to produce a direct-axis current in the armature and/or a quadrature-axis current in the armature; and;
    a feedback loop for controlling the direct axis current and/or the quadrature axis current in the armature to avoid or minimise rotation of the rotor, enabling the electrical drive system to carry full-rated or near full-rated current yet produce little or no torque.

17. A system as claimed in claim 16, wherein the control system, when in use, comprises:
    a non-zero current demand profile to produce a direct axis current and/or a quadrature axis current in the armature.

18. A system as claimed in claim 17, wherein the non-zero current demand profile is configured, when in use, to produce a direct axis current comprising full-rated or near full-rated current demand.

19. A system as claimed in claim 16, wherein the rotor monitor is configured to sense any rotation of the rotor, and the feedback loop is connected to receive an output of the rotor monitor and to produce a quadrature axis current to compensate that rotation.

20. A system as claimed in claim 16, in which the control system is also configured to align, in an alternative mode of operation, the stator and rotor fluxes such that torque is produced on the rotor.

21. A system as claimed in claim 16, wherein the motor comprises:
a dc brushless motor.

22. An electrical drive system according to claim 16, wherein the electric motor is connected to a latching mechanism arranged to restrain the fins of a missile during launch of the missile.

23. A method according to claim 22, wherein the latching mechanism comprises a shear pin configured to break cm actuation.

* * * * *